UNITED STATES PATENT OFFICE.

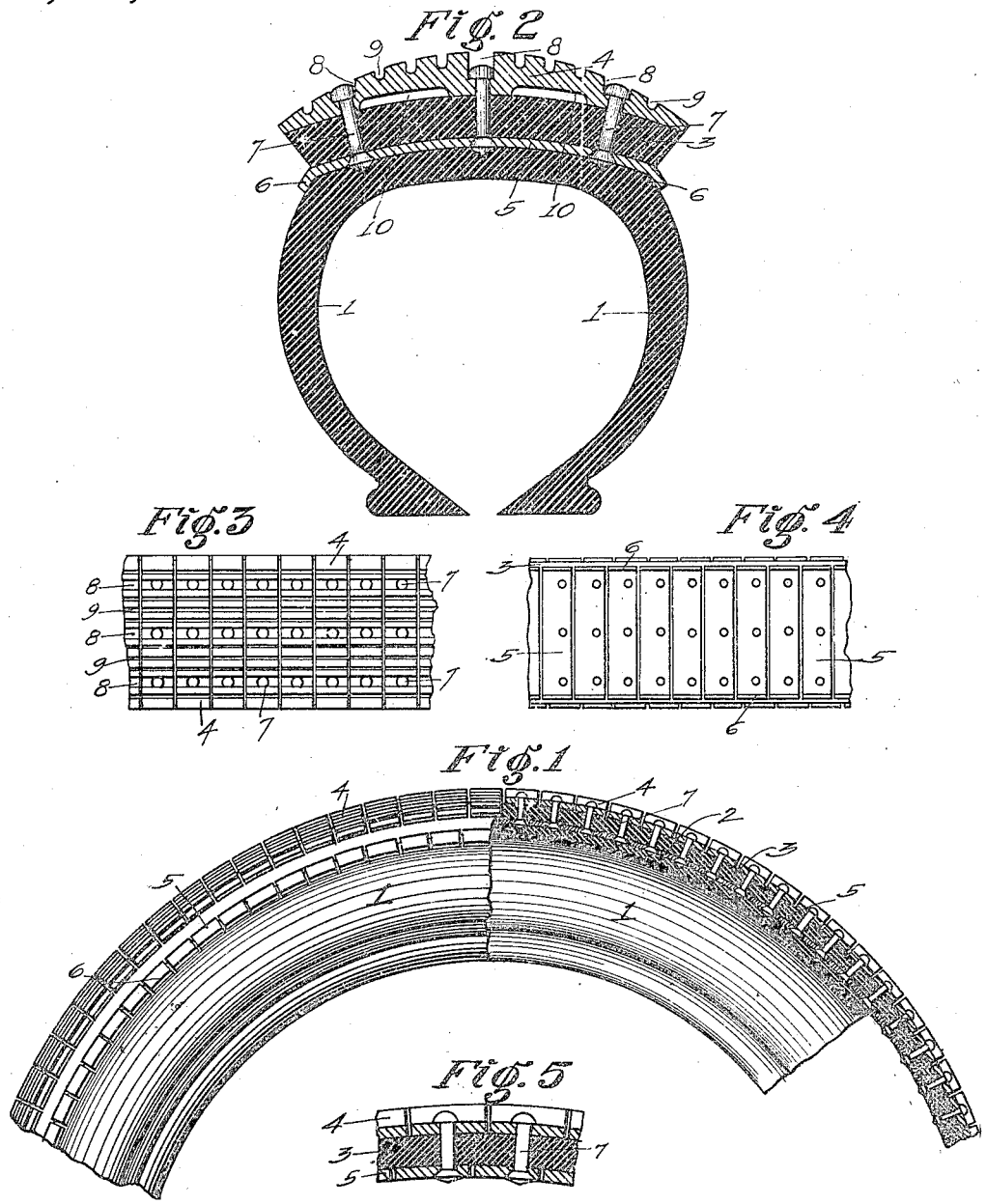

JOHN T. BAKER, OF LOS ANGELES, CALIFORNIA.

AUTOMOBILE-TIRE.

1,146,747. Specification of Letters Patent. Patented July 13, 1915.

Application filed May 15, 1914. Serial No. 839,906.

*To all whom it may concern:*

Be it known that I, JOHN T. BAKER, a citizen of the United States, residing at Los Angeles, in the county of Los Angeles and State of California, have invented a new and useful Automobile-Tire, of which the following is a specification.

My invention relates to automobile tires, and has for its object, the provision of means for preventing punctures in either the outer or inner tubes; the provision of a metallic tread for preventing the wear of the outer casing and the skidding of the tires on wet surfaces, and at the same time insuring a resiliency to the tires; and means whereby the creeping of the tread on the tires may be prevented.

Other objects may appear in the detailed description of my device as illustrated in the accompanying drawings, in which:

Figure 1 is a segmental portion of a tire, partly broken away at the center line; Fig. 2 is a cross section of the same; Fig. 3 is a fragmentary view of the outer portion of the tread belt; Fig. 4 is a similar view of the inner portion thereof; and Fig. 5 is an enlarged fragmentary section of the belt and plates, similar to Fig. 1.

Similar reference numerals indicate the same parts throughout the specifications and the several views of the drawings.

The outer casing 1 is very similar to the common types of such casings except that its outer periphery 2 is formed on a radius greater than the radius of the sides of the casing, and this portion is also slightly thinner than the sides in order to provide a greater resiliency to this part of the casing.

I provide a suitable belt 3 made of the same material and of about the same composition of the tire casing 1. On the outside of this belt I provide a plurality of tread plates 4, and on the inside of the belt an equal number of flat plates 5 having the downwardly extending ends 6 adapted to conform to the sides of the casing 1 and hold the belt on the casing, the plates 4 and 5 being secured to the belt by the rivets 7. The heads of the rivets 7 are countersunk in the transverse grooves 8 of the plates 4 on the outside of the belt 3 and the inner ends are countersunk on the inner side of the flat plates 5 and are slightly pointed and adapted to sink into the tire casing 1 and prevent the creeping, either transversely or longitudinally, of the belt on the tire. The outer plates 5 are also provided with a plurality of transverse grooves 9 extending entirely across the plates to increase the traction, and the recesses 10 on the bottom, which, when the plates are in position on the belt 3, form air chambers between the plate and the belt 3 and prevent the heating of the belt and the tire. The plates 4 and 5 are so positioned with regard to each other that the belt 3 is protected at all points by a metallic covering, the interstices between the plates 5 on the inside of the belt 3 being on a radial line which would cut the plates 4 substantially near the center, so that in the event of a nail, tack or other sharp substance which would ordinarily serve to puncture the casing 1 entering one of the interstices between the outer tread plates 4 it would be prevented from entering the casing 1, and a puncture would be averted. The interstices between the plates on both sides of the belt 3 should be wide enough to provide a freedom of movement to the plates as the belt and tire retract in the running of a vehicle and so that the adjacent plates will not contact and cause a rattling as the wheel revolves.

The belt 3 with its full equipment of plates 4 and 5 is adapted to be placed in position on the outer portion 2 of the tire casing 1 when the tire is deflated, and when the latter is inflated the belt will be held securely in position by means of the outer ends of the inner plates 5 and the inner ends of the rivets 7, as hereinbefore described.

Having thus described my invention, what I claim as new and desire Letters Patent for is:

1. A pneumatic vehicle tire comprising an outer casing provided with a flattened peripheral face and an armored tread composed of an endless resilient belt provided with a plurality of closely spaced, inner and outer, transversely disposed metallic plates, said belt being adapted to seat on the flattened peripheral face of said casing, said inner plates being staggered with respect to said outer plates and secured by common means therewith to said belt, said inner plates serving to hold said tread in position on said casing, and the width of said tread corresponding substantially to the flattened periphery of said casing.

2. A pneumatic vehicle tire comprising an outer casing provided with a flattened peripheral face of a thinner cross section than the sides thereof, and an armored tread corresponding in width to and adapted to seat on said peripheral face, said tread comprising an endless non-metallic belt provided with a plurality of closely spaced, transversely disposed inner and outer metallic plates whose length corresponds substantially to the width of said belt, the inner plates being staggered with respect to the outer plates and commonly secured therewith to said belt, said outer plates having transverse recesses on their inner surface adjacent to said belt, and said inner plates being adapted to firmly hold said tread in position on said casing.

3. A pneumatic vehicle tire including an outer casing provided with a flattened peripheral face and an endless armored tread corresponding in width to and adapted to seat on said peripheral face, said tread comprising a non-metallic belt, an outer set of closely spaced, transversely disposed metallic plates provided with inner transverse recesses, an inner set of closely spaced, transversely disposed metallic plates, staggered with respect to said outer plates and adapted to hold said tread firmly in position on said casing, and common securing rivets for said outer and inner plates the inner ends of which are adapted to project into the peripheral face of said casing for preventing a transverse movement of said tread thereon.

4. In a device of the character described, the combination of an outer casing having the central and outer portion of its periphery formed on a larger radius and substantially thinner than the sides thereof; a resilient belt around the outer periphery of said casing; a plurality of transverse metallic tread plates having transverse recesses on the inner sides thereof mounted on the outer side of said belt; a plurality of transverse metallic inner plates having their ends bent downwardly over and in contact with said casing and on the inner side of said belt; and rivets common to both said outer and inner plates for securing the same to said belt in pairs; the inner ends of said rivets being slightly pointed and adapted to sink into said casing for preventing the creeping of said belt thereon.

JOHN T. BAKER.

Witnesses:
ANNE HARTENSTEIN,
CHARLES H. WILD.